UNITED STATES PATENT OFFICE 2,588,796

COMPOSITIONS CONTAINING ORGANIC POLYMERIC SULFIDES AND METAL SALTS OF 8-HYDROXYQUINOLINE AND METHOD OF PREPARING SAME

Paul G. Benignus, Belleville, Ill., assignor to Monsanto Chemical Company, St. Louis, Mo., a corporation of Delaware No Drawing. Application September 28, 1949, Serial No. 118,469

12 Claims. (Cl. 260—79.1)

This invention relates to polymeric organic sulfides and particularly to the improvement of polymeric organic sulfides obtained by the reaction of an inorganic sulfide and an organic dihalide bearing the halogen atoms on different carbon atoms.

The polymeric organic sulfides are known and have been found valuable in a wide variety of applications. Although the materials are employed in some instances as substitutes for natural rubber, they are chemically different from rubber and react differently with rubber chemicals. For instance, the organic polysulfides are highly resistant to organic solvents and are used as elastomer products in applications where natural rubber would not be suitable at all. The polymeric organic sulfides and their properties are described in the following United States Patents: 1,854,423; 1,890,191; 1,923,392, Re. 19,207, issued June 12, 1934, 2,142,144, 2,195,380.

However, these materials exhibit a number of decidedly objectionable properties, one of which is known as cold flow. They undergo deformation under pressure with but slight recovery. While the products undergo a transformation from a plastic to an elastic state so essential for practical use, nevertheless the transformation is not complete enough for many applications. The vulcanization is generally effected with metallic substances, ordinarily zinc oxide, in contrast to sulfur the curative normally used for rubber. One object of the invention is to provide metallic substances which enhance and improve the transformation of polymeric organic sulfides to an elastic state and reduce cold flow of the cured products.

Another disadvantage of polymeric organic sulfide elastomers is that they support fungus growths and are, therefore, objectionable for making sanitary garments and other objects in which it is desirable to have an elastomer having marked antiseptic, fungistatic or therapeutic properties. Another object of this invention is to provide a class of materials for treating polymeric organic sulfides to impart fungistatic and antiseptic properties. Other and further objects will in part be apparent and in part particularly pointed out in the detailed description following.

In accordance with the present invention the foregoing objects are achieved by the addition to the polymeric organic sulfide of a metal salt of 8-hydroxyquinoline. Examples of typical metal salts which may be used include copper, zinc, iron, magnesium, manganese, cadmium, and aluminum salts. While as little as 0.1% by weight on the elastomer exhibits an appreciable effect, it is preferred that 1.5% to 3.5% by weight on the elastomer of a metal salt of 8-hydroxyquinoline be utilized. Amounts up to 5% by weight may be used to advantage although amounts in excess of 5% generally show no increased benefit.

The present invention may be applied to any of the polymeric materials obtained by the reaction of inorganic polysulfides with organic dihalides. Examples of such dihalides comprise ethylene dichloride, ethylene dibromide, propylene dichloride, di beta chloroethyl acetal, glycerol dichlorhydrin, beta, beta' dichlorodiethylether, 1,3-trimethylene chloride, and dichlorobutylene. Mixtures of organic dihalides may likewise be employed.

As a specific embodiment of the invention, illustrative but not limitative thereof, a stock containing about 2% of the preferred adjuvants was compounded from an elastomer comprising the polymeric reaction product of sodium polysulfide and an organic dihalide and compared to a similar stock containing no hydroquinoline salt. The composition of the stocks was as follows:

|  | Stock—Parts by weight ||
|---|---|---|
|  | A | B |
| Elastomer | 100. | 100. |
| Carbon black | 40. | 40. |
| Zinc oxide | 6. | 6. |
| Dithio bis benzothiazole | 0.3 | 0.3 |
| Diphenyl guanidine | 0.1 | 0.1 |
| Stearic acid | 0.5 | 0.5 |
| Copper salt of 8-hydroxyquinoline | | 3.04 |

The stocks so compounded were cured by heating in the usual manner in a press for 10 minutes at 310° F. Samples of the cured products were artificially aged by heating in an oven for 7 days at 158–160° F. The physical properties of the cured products before and after aging are set forth in the table below:

Table I

|  | Stock | Tensile at Break in lbs./in.$^2$ | Ultimate Elongation | Shore Hardness |
|---|---|---|---|---|
| Unaged | A | 1,150 | 442 | 59 |
| Do | B | 1,387 | 512 | 62 |
| Aged | A | 1,242 | 395 | 67 |
| Do | B | 1,743 | 433 | 73 |

The data show that the B stock containing the copper salt of the oxyquinoline possessed superior physical properties. It will be noted that the tensile strength was higher and although the hardness was increased, the ultimate elongation was also higher. The resistance to cold flow was markedly enhanced by the presence of the copper quinolinolate.

The accelerating and curing activity of copper quinolinolate was found to be considerable. For example, the zinc oxide level commonly used in polymeric organic sulfide compounds is 10 parts per 100 parts of elastomer but it is possible and, in fact, preferable to employ lesser amounts in conjunction with the new adjuvants. For example, the vulcanizing effect of copper quinolinolate is so marked that with the usual amounts of zinc oxide there is a tendency to vulcanize during processing.

The fungistatic qualities of the stocks were examined by standard procedures. The culture medium consisted of the following ingredients:

12.0 g. Bacto Agar
0.3 g. KCl
0.3 g. MgSO$_4$ anhydrous
0.006 g. FeSO$_4$
1.2 g. KH$_2$PO$_4$
1.8 g. NH$_4$NO$_3$
18.0 g. dextrose—anhydrous
600.0 cc. distilled H$_2$O This medium contained in a 1000 cc. flask stoppered with a cotton plug was cooked in an autoclave for 15 minutes at 15 pounds' pressure. The flask was then removed and the pH of the agar adjusted to 5.5 after which the flask was again stoppered with a cotton plug and sterilized in an autoclave for 8 minutes. The flask was removed from the autoclave and after the agar had cooled slightly, 50 cc. portions were transferred to sterilized Petri dishes by means of a sterile pipette.

After the media had jelled, dumbbell test samples of the elastomer were placed on the media in the Petri dishes, three samples of each compound being placed in a separate Petri dish marked for identification. The samples were then sprayed with spore suspensions of the following fungi:

*Aspergillus terreus*
*Aspergillus niger*
*Trichoderma viride*
*Penicillium citrinum*

The dishes were then placed in an incubator at 30° C. and inspected daily for rate of growth for 14 days.

A second fungus test was carried out by the same procedure except that the dextrose was omitted from the agar.

The results of these tests showed that while the A stock supported fungus growth in every case, the B stock exhibited marked retardation of growth.

While the invention has been illustrated by reference to various specific examples, it will be appreciated that numerous modifications may be made without departing from the spirit or scope of the invention. Other accelerators, curatives, and compounding ingredients may be used where desired.

The invention is limited only by the claims attached hereto as part of the present specification.

What is claimed is:

1. A composition comprising a polymeric organic sulfide obtained by the reaction of an inorganic polysulfide on an aliphatic dihalide having the halogens on separate carbon atoms and a metal salt of 8-hydroxyquinoline.

2. A composition comprising a polymeric organic sulfide obtained by the reaction of an inorganic polysulfide on an aliphatic dihalide having the halogens on separate carbon atoms and a heavy metal salt of 8-hydroxyquinoline.

3. A composition comprising a polymeric organic sulfide obtained by the reaction of an inorganic polysulfide on an aliphatic dihalide having the halogens on separate carbon atoms and a copper salt of 8-hydroxyquinoline.

4. A composition comprising a polymeric organic sulfide obtained by the reaction of an inorganic polysulfide on an aliphatic dihalide having the halogens on separate carbon atoms and a zinc salt of 8-hydroxyquinoline.

5. The method of treating a polymeric organic sulfide obtained by the reaction of an inorganic polysulfide on an aliphatic dihalide having the halogen on separate carbon atoms which comprises incorporating therein a metal salt of 8-hydroxyquinoline.

6. The method of treating a polymeric organic sulfide obtained by the reaction of an inorganic polysulfide on an aliphatic dihalide having the halogen on separate carbon atoms which comprises incorporating therein a heavy metal salt of 8-hydroxyquinoline.

7. The method of treating a polymeric organic sulfide obtained by the reaction of an inorganic polysulfide on an aliphatic dihalide having the halogen on separate carbon atoms which comprises incorporating therein a copper salt of 8-hydroxyquinoline.

8. The method of treating a polymeric organic sulfide obtained by the reaction of an inorganic polysulfide on an aliphatic dihalide having the halogen on separate carbon atoms which comprises incorporating therein a zinc salt of 8-hydroxyquinoline.

9. The cured elastomer obtained by incorporating a metal oxide and a metal salt of 8-hydroxyquinoline into a polymeric organic sulfide obtained by the reaction of an inorganic polysulfide on an aliphatic dihalide having the halogen on separate carbon atoms and heating the mixture.

10. The cured elastomer obtained by incorporating zinc oxide and a heavy metal salt of 8-hydroxyquinoline into a polymeric organic sulfide obtained by the reaction of an inorganic polysulfide on an aliphatic dihalide having the halogen on separate carbon atoms and heating the mixture.

11. The cured elastomer obtained by incorporating zinc oxide and a copper salt of 8-hydroxyquinoline into a polymeric organic sulfide obtained by the reaction of an inorganic polysulfide on an aliphatic dihalide having the halogen on separate carbon atoms and heating the mixture.

12. The cured elastomer obtained by incorporating zinc oxide and a zinc salt of 8-hydroxyquinoline into a polymeric organic sulfide obtained by the reaction of an inorganic polysulfide on an aliphatic dihalide having the halogen on separate carbon atoms and heating the mixture.

PAUL G. BENIGNUS.

REFERENCES CITED

The following references are of record in the file of this patent:

UNITED STATES PATENTS

| Number | Name | Date |
|---|---|---|
| Re. 19,207 | Patrick | Sept. 19, 1929 |
| 2,102,564 | Bonstein | Dec. 14, 1937 |
| 2,195,380 | Patrick | Mar. 26, 1940 |
| 2,272,399 | Becher | Feb. 10, 1942 |
| 2,381,863 | Benignus | Aug. 14, 1945 |
| 2,470,529 | Stewart | May 17, 1949 |
| 2,530,770 | Hopperstead | Nov. 21, 1950 |